US007058516B2

(12) United States Patent
Mascarenhas

(10) Patent No.: US 7,058,516 B2
(45) Date of Patent: Jun. 6, 2006

(54) COMPUTER IMPLEMENTED SEARCHING USING SEARCH CRITERIA COMPRISED OF RATINGS PREPARED BY LEADING PRACTITIONERS IN BIOMEDICAL SPECIALTIES

(75) Inventor: Desmond D. Mascarenhas, Los Altos Hills, CA (US)

(73) Assignee: Bioexpertise, Inc., Sunnyvale, CA (US)

( * ) Notice: Subject to any disclaimer, the term of this patent is extended or adjusted under 35 U.S.C. 154(b) by 633 days.

(21) Appl. No.: 09/906,888

(22) Filed: Jul. 16, 2001

(65) Prior Publication Data

US 2003/0014428 A1    Jan. 16, 2003

Related U.S. Application Data

(60) Provisional application No. 60/220,398, filed on Jul. 24, 2000.

(51) Int. Cl.
*G06F 7/00* (2006.01)
*G06F 17/00* (2006.01)
*G06F 19/00* (2006.01)

(52) U.S. Cl. .............................. 702/19; 707/1; 707/101; 707/102

(58) Field of Classification Search ................. 702/19, 702/22; 703/11; 707/1, 101, 102, 104, 512
See application file for complete search history.

(56) References Cited

U.S. PATENT DOCUMENTS

| 5,721,910 A | | 2/1998 | Unger et al. |
| 5,724,571 A | | 3/1998 | Woods |
| 5,852,812 A | * | 12/1998 | Reeder .......................... 705/39 |
| 5,859,972 A | * | 1/1999 | Subramaniam et al. ..... 709/203 |
| 5,987,390 A | * | 11/1999 | Ladunga ....................... 702/19 |

FOREIGN PATENT DOCUMENTS

| WO | WO 97/08604 | 3/1997 |
| WO | WO 00/36529 | 6/2000 |

OTHER PUBLICATIONS

Miccioli, www.LLRX.com, Update to Researching Medical Literature on the Web, Sep. 15, 1999, pp. 1-10.*
L. Guernsey, "The Search Engine as Cyborg", The New York Times, Jun. 29, 2000, 5 pgs.
J. Ambroziak et al., "Natural Language Technology in Precision Content Retrieval", Sun Microsystems, Dec. 1998, 12 pgs.
A. Woods, "Knowledge Management Needs Effective Search Technology", Sun Journal, 1994, 8 pgs.
C. Robbins-Roth, "From Alchemy to IPO", Apr. 2000, 4 pgs.
S. Chakrabarti et al., "Scalable feature selection, classification and signature generation for organizing large text databases into hierarchical topic taxonomies", The VLDB Journal vol. 7, 1998, pp. 163-178.

* cited by examiner

*Primary Examiner*—Marianne P. Allen
(74) *Attorney, Agent, or Firm*—Morrison & Foerster LLP

(57) ABSTRACT

The present invention provides a system and method for creating and maintaining a Biomedical document database, wherein the documents have been reviewed by biomedical and other experts, who have assigned taxonomic based indicia to each document wherein a specialized search engine can rapidly retrieve relevant documents based upon the commnly known taxonomy.

5 Claims, 19 Drawing Sheets

100 ⟹ Typical Internet Network Configuration

<u>200</u>  Typical General Purpose Computer/

Dimension #1

|  | ENTERPRISE DOMAIN |
|---|---|
| Dimension #1 |  |
| B | BASIC SCIENCE |
| T | TECHNOLOGICAL |
| C | CORPORATE |
| S | SOCIETAL |

— 701
— 703
— 705
— 707
— 709

Dimension #2

|  | DISEASE GROUP |
|---|---|
| N | NEOPLASIA |
| V | CARDIOVASCULAR DISEASE |
| D | DEGENERATIVE DISEASES |
| I | IMMUNE DISEASE |
| E | ENDOCRINE / METABOLIC DISEASE |
| G | GENETIC DISEASE |
| M | PSYCH./MENTAL HEALTH |
| F | INFECTIOUS DISEASES |
| U | NONE-OF-THE-ABOVE |
| Y | ALL-OF-THE-ABOVE |

— 711
713

Dimension #3

|  | UNDERLYING EDUCATIONAL CONCEPTS |
|---|---|
| L | SCIENTIFIC CERTAINTY |
| P | PLASTICITY OF BIOLOGICAL SYSTEMS |
| H | REGULATORY CIRCUITS / HOMEOSTASIS |
| X | REDUCTIONIST vs SYSTEMATIC METHOD |
| O | SCIENCE AS A SOCIOECONOMIC PROCESS |
| Z | UNDEFINED |

— 715
717

IF "B" OR "T" WAS SELECTED IN DIMENSION #1:

Dimension #4

|  | INVESTIGATIVE EMPHASIS |
|---|---|
| R | REDUCTIONIST |
| A | ABSTRACTIVE |

IF "B" WAS SELECTED IN DIMENSION #1:

1B1

| | TOPIC |
|---|---|
| 01 | GENOMES, POPULATIONS AND EVOLUTION |
| 02 | BIOINFORMATICS |
| 03 | GENE / DNA STRUCTURE |
| 04 | RNA SYNTHESIS, STRUCTURE, FUNCTION |
| 05 | PROTEIN SYNTHESIS, STRUCTURE, FUNCTION |
| 06 | METABOLIC PATHWAYS |
| 07 | MACROMOLECULAR TRANSPORT |
| 08 | MOLECULAR ENDOCRINOLOGY |
| 09 | SIGNAL TRANSDUCTION |
| 10 | DNA REPLICATION, CELL CYCLE |
| 11 | CELL GROWTH, DIFFERENTIATION, DEATH |
| 12 | ORGAN SYSTEMS |
| 13 | INFECTIOUS AGENTS |
| 14 | EPIDEMIOLOGY |
| 15 | PRECLINICAL STUDIES |

— 725

} 727

IF "T" WAS SELECTED IN DIMENSION #1:

1T1

| | TOPIC |
|---|---|
| 16 | DNA ANALYSIS / CHIPS / ARRAYS |
| 17 | GENE CLONING & MANIPULATION |
| 18 | VECTORS & GENE EXPRESSION |
| 19 | PROTEIN ENGINEERING |
| 20 | PROTEIN PURIFN./PROCESS DEVT. |
| 21 | QC/ANALYTICAL CHEMISTRY |
| 22 | PRECLINICAL STUDIES (TOXICOLOGY) |
| 23 | |

— 729

} 731

IF "C" WAS SELECTED IN DIMENTION #1:

| 1C1 | TOPIC |
|---|---|
| 24 | QA & REGULAORY AFFAIRS |
| 25 | INTELLECTUAL PROPERTY |
| 26 | DRUGS DEVELOPMENT |
| 27 | DIAGNOSTICS: DEVELOPMENT |
| 28 | DEVICES DEVELOPMENT |

1. Rate significance in subcategories of first dimension

FIG. 9

POST & CRITIQUE A REFERENCE

1. Capture citation from PubMed government database

Submit reference to BioCritique database /─1601

COMPUTER IMPLEMENTED SEARCHING USING SEARCH CRITERIA COMPRISED OF RATINGS PREPARED BY LEADING PRACTITIONERS IN BIOMEDICAL SPECIALTIES

CROSS-REFERENCE TO RELATED APPLICATIONS

This application claims the benefit of U.S. Provisional application Ser. No. 60/220,398 filed Jul. 24, 2000.

This application relates to co-pending provisional applications:

(1) Ser. No. 60/216,469, filed Jul. 6, 2000, titled "System and Method for Matching Psychological Profile Information with Target Information";

(2) Ser. No. 60/215,492, filed Jul. 6, 2000, titled "System and Method for Anonymous Transaction In A Data Network and User Profiling of Individuals Without Knowing Their Real Identity.";

(3) Ser. No. 60/252,868, filed Nov. 21, 2000, titled "Interactive Assessment Tool.";

which are incorporated fully herein by reference.

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to the field of electronic computer related systems. More particularly, the present invention relates to a method and system for the automated search of document files using search criteria based upon document identifiers generated by expert reviewers in lieu of key words in context, and relates to a method and system for indexing such documents.

BACKGROUND ART

A technical problem presently exists in the attempt to use modem day search engines for searching for documents on the world wide web (the "web"). Generally the problems facing users is that almost all search engines search for key words in all or portions of the documents. The problem with key word searches is that an extremely large number of documents are usually returned by the search engine, all of which typically must be read or scanned to find those few documents or that one document that contains the desired information. Lexis™, Altavista™, Yahoo™, are examples of such key-word based search systems. Some specialized databases, such as the database of U.S. issued patents, contained at the site, delphion.com and at the U.S. Patent Office web site, uspto.gov, permit customized searches with known parameters in lieu of key words, such as Inventor name, assignee name, patent agent name, etc., but also include key-word searches. These searches also suffer from the same malady: returning many documents which must generally be read to find the pertinent ones.

An article titled "The Search Engine as Cyborg" By LISA GUERNSEY, The New York Times, Jun. 29, 2000 further describes the problem. The article explains that "To cope, many search engines have concluded that simply indexing more pages is not the answer. Instead, they have decided to rely on the one resource that was once considered a cop-out: human judgment. Search engines have become more like cyborgs, part human, part machine." For example, a highly ranked search service is AskJeeves™, which prods people to narrow their queries by picking from a list of questions and answers written by the company's employees.

Both Google™ and Northern Light™ rely on computers and software to scan and index the Web, but human judgment is part of the mix. At Google, Web pages that are linked from authoritative Web sites are deemed most relevant. At Northern Light, librarians constantly fine-tune their directory structure and come up with names of categories used for sorting Web sites. Similarly, some music sites appear to have songs indexed with ratings by distributors or listeners as to genre, type such as vocalist, instrumental, folk, jazz, hip-hop, etc. so that selections by these criteria can be made. See for example, listen.com.

Some other efforts have been made to solve this problem. For example Manning & Napier Information Services Inc.™ of Rochester, N.Y. has several products whose technologies are based on research and development in information retrieval (IR) and artificial intelligence (AI), including natural language processing (NLP), information extraction, agents, link analysis, question-answering, data visualization, data fusion, knowledge discovery, knowledge management, genetic algorithms, neural nets, and cross-language information retrieval (CLIR). This system is built around a process whereby the searcher is requested to give the system much more data than just a few key words (a paragraph, for example, to attempt to describe the document contents). The system then constructs a linguistic vector based upon the paragraph given as the search argument and attempts to find equivalent vectors in its document databases. This is not a general Internet search engine system but rather a proprietary one that has its own databases of documents which have been previously processed to produce linguistic vectors which characterize the documents, based on the word contents of the documents.

Another approach to solving the basic key word search problem has been developed by Dr. William Woods, at Sun Microsystems™, Inc. Laboratories. Dr. Woods has addressed the problem wherein the articulation of the desired subject matter is different that that used by the authors of the documents being searched. This is sometimes referred to as the "synonym problem" although Dr. Woods characterizes the problem in a broader connotation by referring to it as the "paraphrase problem" and his general solution approach is called "conceptual indexing" and more specifically as "subsumption technology." Subsumption technology is used to automatically integrate syntactic, semantic, and morphological relationships among concepts that occur in the material, and to organize them into a structured conceptual taxonomy that is efficiently useable by retrieval algorithms and also effective for browsing. Dr. Woods conceptual indexing approach is described in a number of papers including "Natural Language Technology in Precision Content Retrieval" by Jacek Ambroziak and William A. Woods, Proceedings of the International Conference on Natural Language Processing and Industrial Applications, Aug. 18–21, 1998, Moncton, New Brunswick, Canada, and "Knowledge Management Needs Effective Search Technology," by William A. Woods, Sun Journal, March, 1998 both of which are incorporated fully herein by reference.

As these papers describe, the Sun Microsystems Laboratories' Conceptual Indexing Project was created to address the problems cited above and to improve the convenience and effectiveness of online-information access. A central focus of this project is the "paraphrase problem," in which the words in a query are different from, but conceptually related to, those in material one needs. This project developed techniques that use knowledge of word and phrase meanings and their inter-relationships to find correspondences between the words one uses in their request and concepts that occur in text passages.

In this solution to the problem, they use taxonomic subsumption algorithms that exploit generality, or subsumption, rather than synonymy. That is, when a concept is more general than another, the more general concept is said to subsume the more specific one and concepts are organized around the notion of conceptual subsumption rather than synonym classes. This relates more general concepts to more specific ones without losing information and enables a retrieval algorithm to automatically find subsumed concepts. The algorithms do not automatically explore more-general terms, so the level of generality is controlled by the searcher's choice of query terms. For example, if one asked for "motor vehicles," he would get trucks, buses, cars, etc., whereas if he asked for "automobiles," he would get cars and taxicabs but not trucks and buses. The algorithm can let one know about more-general concepts that subsume the searcher's query, in case he wants to generalize his request, but it does not make this decision without the user's knowledge and consent.

This approach is further taught in U.S. Pat. No. 5,724,571 issued Mar. 3, 1998 (Woods) titled "Method and apparatus for generating query responses in a computer-based document retrieval system" which is also incorporated fully herein by reference.

The key concepts in the Woods and Manning & Napier approaches are that a two step process is required: First a linguistic vector or structured conceptual taxonomy must be constructed by the indexing engine when the material is indexed, and second a special retrieval algorithm is used to find either equivalent linguistic vectors or combinations of morphological and semantic subsumption relationships that connect concepts in the request with concepts that occur in the indexed material. While both approaches appear to provide significant efficiency over key word searches, and while the Wood approach appears to be the more efficient of the two, both have the same disadvantages. Both systems require first a baseline database of target documents and second a powerful lexical computing engine to create the linguistic vectors or combinations of morphological and semantic subsumption relationships. Only then can the search technologies of the two be used.

However these systems as well as the earlier described databases containing popularity-based ratings use fixed, pre-determined indexing algorithms to mathematically combine words and phrases in a description vector which can be matched with a similarly computed vector based on search criteria inputted by the user.

What is needed is a database system with individual document ratings from experts in the field where these expert ratings are based on an accepted taxonomy of attributes for the specific field rather than an unrelated mathematical algorithm. It would be these expert ratings that would be the basis of a search rather than an algorithmatic computation built around the words in the document. And similarly needed is a search engine capable of mapping inputted search attributes to this expert ratings attribute indexed database.

Biomedicine is largely a knowledge industry. While a physical product, the medicine, does have to be developed, tested, manufactured and delivered, the knowledge of how to do so and the knowledge of which product works best in particular cases contributes most of the value.

A second characteristic of biomedical knowledge is that it is highly dynamic. At the research level, significant advances in our understanding of biomedical phenomena happen on a weekly basis. Therefore, biomedical professionals have an ongoing need to keep up with the advances relevant to their own specialty area. Such needs have become particularly acute in health-care, because patients can now use the Web to learn about the latest developments themselves; as a result, they demand increasingly detailed and timely information from health-care professionals.

Needs Relating to Centralization

There is as yet no centralized source of biomedical information on the web. The information one seeks may be available somewhere on the web. The hard part is finding it. There are thousands of biomedical Web pages, ranging from individual sites to corporate sites. These sites generally fall into the following categories:
  Government research center sites
  University biomedical sites
  Commercial firm sites (including vendor firms)
  Biomedical journal sites
  Individual researcher/professor sites (usually only a few pages with papers and links)

A list of the major Web sites can be found in an Appendix in the recently published book, "From Alchemy to IPO; The Business of Biotechnology," by Cynthia Robbins-Roth, Perseus Books Group, 2000, ISBN 0-738202533, which is incorporated herein by reference.

Needs Relating to Search Strategies

Despite the availability of an enormous amount of information, this information is not indexed or summarized for easy consumption.

1. Existing human-edited directories, such as Yahoo, do not have the skilled biomedical personnel or the time to adequately index biomedical pages. Human-edited directories, such as Yahoo, generally index only a small fraction of the Web, because of the cost of having human workers look at each page.

2. Existing search engines that mechanically index pages, such as Alta-Vista, also have limitations as indicated above: the number of irrelevant pages generated; and the poor quality of links generated.

Needs Relating to Contextualization

Another problem caused by specialized content is incomplete understanding. No individual is a specialist in all subsets within a particular discipline. Thus, there are always parts of the content that are more understandable than others. This is particularly so when the user is a non-specialist and the content is, say, a biomedical research paper. There is a need to provide information in a form such that the user can quickly grasp the essentials of concepts underlying the content.

Needs Relating to Personalization

An additional issue of importance to the effective dissemination of biomedical content is the manner in which content is served to the user. Virtually all content on the web today is served in a one-size-fits-all mode. Nevertheless, studies have shown that people learn better when content is presented in a manner more suited to their own individual cognitive style.

Needs Related to Multidimensional Taxonomies.

Another problem with presently known search approaches is that they address taxonomies which are, basically, hierarchical i.e. one-dimensional. However in many domains, in the biomedical arena for example, an n-dimensional taxonomy is more appropriate. That is, a biomedical development might be considered mundane from a technical standpoint, yet highly significant from a social or business viewpoint. While it is true that this "significance" issue might be expected to be handled by the way the query is structured (i.e. from the technical viewpoint or from the social or business viewpoint), systems such as the Sun and Manning & Napier systems cannot handle these issues because of the pre-defined mathematical indexing algorithms they use.

The solution to these technical problems therefore is to provide a method for analyzing a database of documents wherein a multi-dimensional taxonomy of attributes for a specific domain can be developed and used to tag the related documents with significance rating indicia, which can then be searched by a qualitative matching engine.

SUMMARY OF THE INVENTION

The present invention provides a solution to the needs described above through a system and method for creating and maintaining a Biomedical document database, wherein the documents have been reviewed by biomedical and other experts, who have assigned taxonomic based attribute indicia to each document wherein a specialized search engine can rapidly retrieve relevant documents based upon the commonly known taxonomy.

A method is disclosed for creating and maintaining a biomedical reference database in which each reference is associated with rating attributes across a multi-dimensional taxonomy. "Reference" is defined as a URL or literature citation associated with an original research article or similar content. The input interface components for this database are:

1. An Interface for expert input of references: Expert input may be provided by the editorial staff of a leading trade journal, by selected leading practitioners in the field, or by other similar expert mechanism. For the purposes of biomedical research expert knowledge, "leading practitioners," or "domain experts" are defined as those within the top echelon of researchers within the biomedical sub-specialty in question, as judged by publication record, public recognition through competitive awards (such as the Nobel prize) and peer evaluations.

2. An Interface for expert ratings of references: Expert input (as defined in the previous section) regarding each reference is collected under a multidimensional rating taxonomy. Each reference receives ratings under each relevant taxonomic category from appropriate expert sources. A composite rating may be computed from the mean of multiple ratings received under a single taxonomic category.

3. An Optional interface for expert commentary: Expert ratings may be accompanied by text commentary on each reference. Such commentary received from multiple expert sources can provide additional insight into the relevance of a particular reference.

4. An Optional interface for acquiring profiles of experts: Input from each expert source may be normalized for certain variables, based on attributes measured for that expert source. For example, mean ratings and distributions collected and analyzed from each expert source may allow that expert's rating input to be expressed as standard deviations from the mean.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which:

FIGS. 7A–7C illustrate a preferred embodiment of an exemplary data structure of a taxonomy structure for use with the present invention.

FIG. 9 illustrates a preferred embodiment of an exemplary input screen showing how to rate significance in subcategories of first dimension.

DETAILED DESCRIPTION OF THE INVENTION

Figure 1:
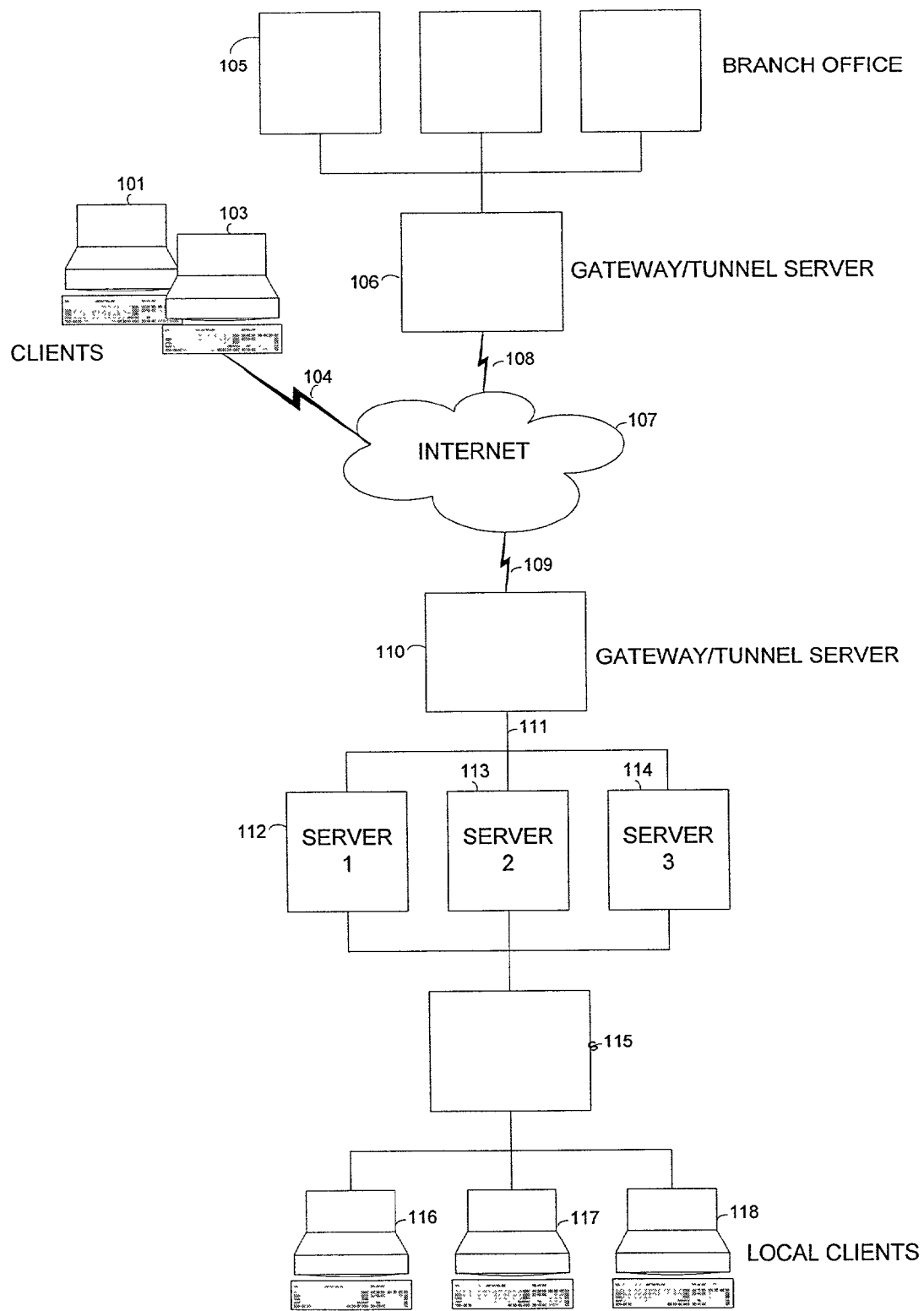
FIG. 1 illustrates an exemplary Internet distributed system configuration.

The present invention provides a solution to the needs described above through a system and method for creating and maintaining a Biomedical document database, wherein the documents have been reviewed by biomedical and other experts, who have assigned taxonomic based indicia to each document wherein a specialized search engine can rapidly retrieve relevant documents based upon the commonly known taxonomy.

A method is disclosed for creating and maintaining a biomedical reference database in which each reference is associated with rating attributes across a multi-dimensional taxonomy. "Reference" is defined as a URL or literature citation associated with an original research article or similar content. The input interface components for this database are:

1. An Interface for expert input of references: Expert input may be provided by the editorial staff of a leading trade journal, by selected leading practitioners in the field, or by other similar expert mechanism. For the purposes of biomedical research expert knowledge, "leading practitioners," or "domain experts" are defined as those within the top echelon of researchers within the biomedical sub-specialty in question, as judged by publication record, public recognition through competitive awards (such as the Nobel prize) and peer evaluations.

2. An Interface for expert ratings of references: Expert input (as defined in the previous section) regarding each reference is collected under a multidimensional rating taxonomy. Each reference receives ratings under each relevant taxonomic category from appropriate expert sources. A composite rating may be computed from the mean of multiple ratings received under a single taxonomic category.

3. An Optional interface for expert commentary: Expert ratings may be accompanied by text commentary on each reference. Such commentary received from multiple expert sources can provide additional insight into the relevance of a particular reference.

4. An Optional interface for acquiring profiles of experts: Input from each expert source may be normalized for certain variables, based on attributes measured for that expert source. For example, mean ratings and distributions collected and analyzed from each expert source may allow that expert's rating input to be expressed as standard deviations from the mean.

As appropriate, input interfaces may be designed to collect information relating to time of input, and other relevant attributes. Keywords, summaries, abstracts, slides, audio, editorials, interactive modules, educational content and other items related to a reference may also be stored in the database.

The computational and search functions associated with this database are built around the unique attributes stored for each reference. Any conventional quantitative search algorithm may be utilized. For example, a search query may utilize taxonomic category information (example: cancer), date of reference (example: significant developments in the last 3 months), bias of party making the search (for example, an individual may be interested in cancer, but particularly interested in new clinical treatment modalities—not in basic science research advances) or any other pertinent attributes.

The relative contribution of each attribute comparison to the final match reported may be manipulated by any prediction algorithm. The result returned by the search algorithm may be a score. Results of a search may be displayed as a list of references sorted by score, or it may be searched further by additional criteria.

Each reference may be linked to derivatives such as keywords, summaries, abstracts, slides, audio, editorials, interactive modules, educational content and other items related to a reference.

The biomedical reference rating database may be created and searched, using the elements described in the preceding paragraphs. The salient features of this system are its multi-dimensional taxonomy of rating categories, and its strict dependence on expert ratings. An expert panel-based mechanism, or other similar peer-review-based mechanism, is the only traditionally credible method for assigning significance in the biomedical domain. For this reason it remains quite distinct from "popularity contest" rating systems wherein the source of the rating is not known to be expert. One value of a credible rating system is that the database and search functions described above generate results which are credible and trusted by biomedical professionals and, by extension, those non-professional or non-specialist audiences that rely on the judgement of biomedical professionals.

The invention is described in more detail below by way of descriptions of a preferred embodiment, however those skilled in these arts will recognize that various specific implementations of the functions described will accomplish the results of the invention.

Operating Environment

The environment in which the present invention is used encompasses the general Internet-based systems hardware and infrastructure along with well known electronic transmission protocols both conventional and wireless.

Some of the elements of a typical Internet network configuration are shown in FIG. 1, wherein a number of client machines 105 possibly in a remote local office, are shown connected to a gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a central lab or office via an ISP connection 109 to a gateway/tunnel-server 110 which is connected 111 to various enterprise application servers 112, 113, 114 which could be connected through another hub/router 115 to various local clients 116, 117, 118. Any of these servers 112, 113, 114 could function as a database server for the storage of the indexed documents and messages of the present invention as well as the server for the search engine of the present invention, as more fully described below.

Figure 2:
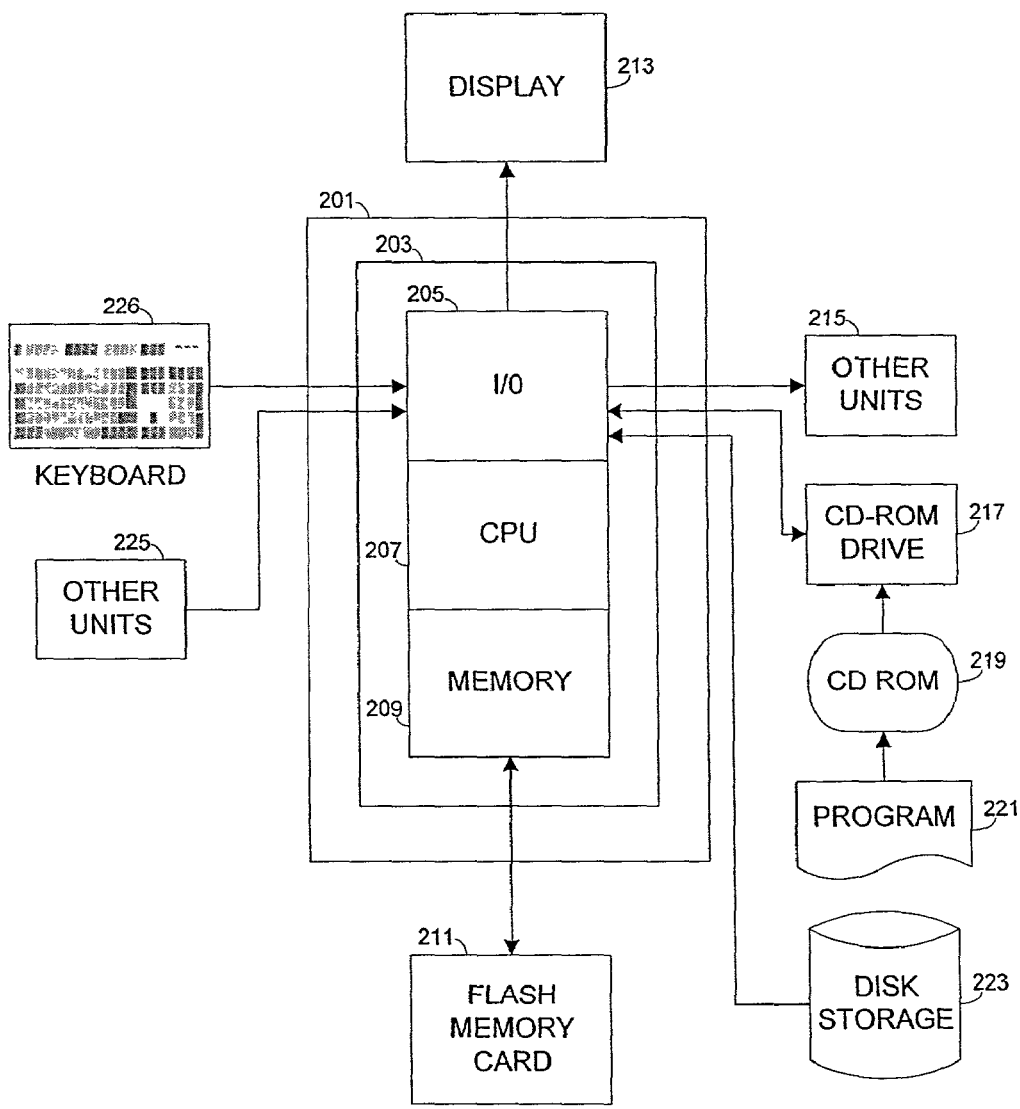
FIG. 2 illustrates a representative general purpose computer server configuration.

An embodiment of portions of the Document Search System of the present invention can operate on a general purpose computer unit which typically includes generally the elements shown in FIG. 2. The general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

The preferred Embodiment

Some of the distinguishing factors in the invention over the prior art are:

1. The rating taxonomy which, in our case, is multidimensional and developed over the biomedical domain. The multidimensional nature of the classification of knowledge is a key element because those skilled in these arts have been able to come up with a satisfactory systematization of biomedical knowledge "significance" without it. That is, significance or relevance (both in its individual or in its broader societal sense) is dimensional. For example a particular research paper in the area of cancer will be rated for significance in a particular way if the dimension is, say, drug development, but in a completely different way if the dimension is basic science impact, technological impact, or societal impact.

Figure 6:
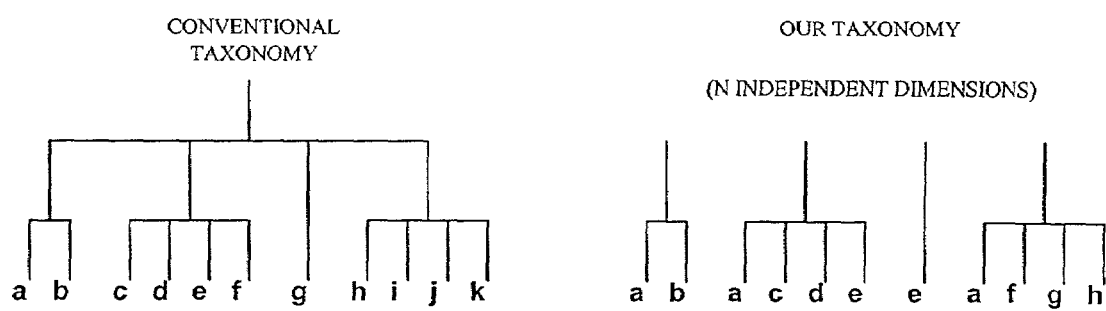
FIG. 6 illustrates a preferred embodiment of an exemplary data structure of a multidimensional taxonomy structure.

Once again, an n-dimensional taxonomy is used wherein each dimension is independent. That is, the same item may eventually appear under several dimensions of the taxonomy (see FIG. 6). This is novel and important for developing a comprehensive taxonomy in the biomedical arena. Most traditional taxonomies are hierarchical. For example the music rating taxonomy of Listen.com would have various branches and the final categories would all be distinct.

The distinction is important because people look at knowledge in a multi-dimensional way. Significance means different things, even to the same person, depending on the dimension. For example, a biomedical development might be considered mundane from a technical standpoint, yet highly significant from a social or business standpoint.

2. An input interface for tagging items with a significance rating according to the taxonomy (this includes the peer-review mechanisms described below, which are different from the art in that they employ expert panels). The rating is done by acknowledged experts in the dimension of relevance, in a peer-review process analogous to grant proposal review, or pre-publication manuscript review. It is this process that brings credibility to the ratings.

3. A profiling interface (which may itself contain several embedded technologies) for creating profiles of users. Again, a multidimensional taxonomy of user profiles is used, which is also believed to be distinct from the art. For example, one dimension may be knowledge taxonomic domains, the other dimension may be some or all of the following profile layers:
   a. User ID
   b. predicted preferences (based, for instance on inferred cognitive style)
   c. reported preferences (by user)
   d. reported experience (by user)
   e. locally documented experience (such as assessment test results, purchase records)
   f. composite profile layer 4. A personalized search strategy based on each individual's weighted preferences in the categories of our multidimensional taxonomy. A person might want to know the most significant recent developments in the field of cancer, but what does that really mean? If that person's preferences are for developments of translational interest or, even more complicating, developments of translational interest which offer opportunities for investment, the present system of keyword searches could never satisfy this requirement. Thus, our rating taxonomy allows for novel ways of searching for "significant" knowledge. The search is personalized with respect to what would be considered significant.

An alternative embodiment may include predictional algorithms based on prior research findings. These may optionally be used to compute the "composite profile" of a user. Calculating a composite profile may be useful in situations where information about a user's interest in specific taxonomic categories might be derived from several different sources such as known professional experience, self-reported experience, self-reported interest, or actually recorded performance in educational assessments or other interactive modules. In such cases, it may be desirable to compute and use a composite profile calculated from these disparate sources of input information. The actual method of computation may be an arithmetic mean, a weighted mean based on hypothesis or previous findings, or any other suitable computation. A detailed example of how composite profiles may be constructed from psychometric data is described in Applicant's co-pending U.S. provisional patent application Ser. No. 60/216,469, filed Jul. 6, 2000, titled "System and Method for Matching Psychological Profile Information with Target Information" which is incorporated fully herein by reference.

In alternative embodiments, any appropriate quantitative matching algorithm and search engine may be used. For example, Liquid Engines™ Inc. has developed a generally matching algorithm which may be used for this search purpose.

Functional Implementation

A method is disclosed for creating and maintaining a biomedical reference database in which each reference is associated with rating attributes across a multi-dimensional taxonomy.

In the preferred embodiment, the search function of this invention will serve professional users in a far more sophisticated manner than currently available search methods, with directory/search engine features more suited to current needs.

Content Sorting and Summarization: Search Strategies

In the preferred embodiment, the primary goal is to make relevant biomedical content as easy as possible to find—and to present it in a form that is easy to digest.

To select references for rating two methods can be used. First the existing brand-name credibility and editorial capabilities of the undisputed opinion-leading trade journals, academic institutions, and science journalists in a biomedical specialty may be used; these include journals such as Nature™ and Science™, institutions such as U.C. Berkeley™ and Stanford™, and journalistic enterprises like SoundVision™ and Nova™. Secondly, to determine content relevance, online expert panels organized under subject categories, can be used. The process is analogous to peer review of grant proposals, manuscripts and scientific presentations, and can generate substantial community interest. A systematic method of processing ratings and editorial comments on each month's most significant developments in the biomedical field has been developed by the inventor. Users will sort content based on these ratings and their own interest profiles.

Each search result lists a variety of derivative products. For example, instead of providing the original research articles, a link to summaries and short editorial commentary relating to such articles may be provided. Each summary is also linked to the original content.

Contextualization

In the preferred embodiment, each derivative page is hypertextually linked to a central biomedical knowledge database, allowing for quick educational reference to the underlying concepts. This adds value to the consumer's need to understand the content more fully, in the shortest amount of time.

In any academic field, not only is the original research important, but also the comments and feedback from others. Was the study properly done? Was it refuted later? What does it really mean, in the big picture of things? Today, systematic editorial comment on research topics is difficult to find. In this respect, comments from colleagues can be invaluable, and the site of the preferred embodiment will also be a community where biomedical professionals can share (unpublished) comments and opinions of the type normally exchanged in faculty dining halls. As indicated above, software-based technologies that facilitate and promote such exchanges among physicians and among biotech researchers have been developed.

Personalization

In order to customize the display of content to each user, some information will be stored and served in two formats (expert and non-expert). A biomedical researcher with a Ph.D. might see a different version of selected content than a non-specialist.

These characteristics of the preferred embodiment are now described in additional detail. The overall functional operation of the system in general will now be described.

Figure 3:
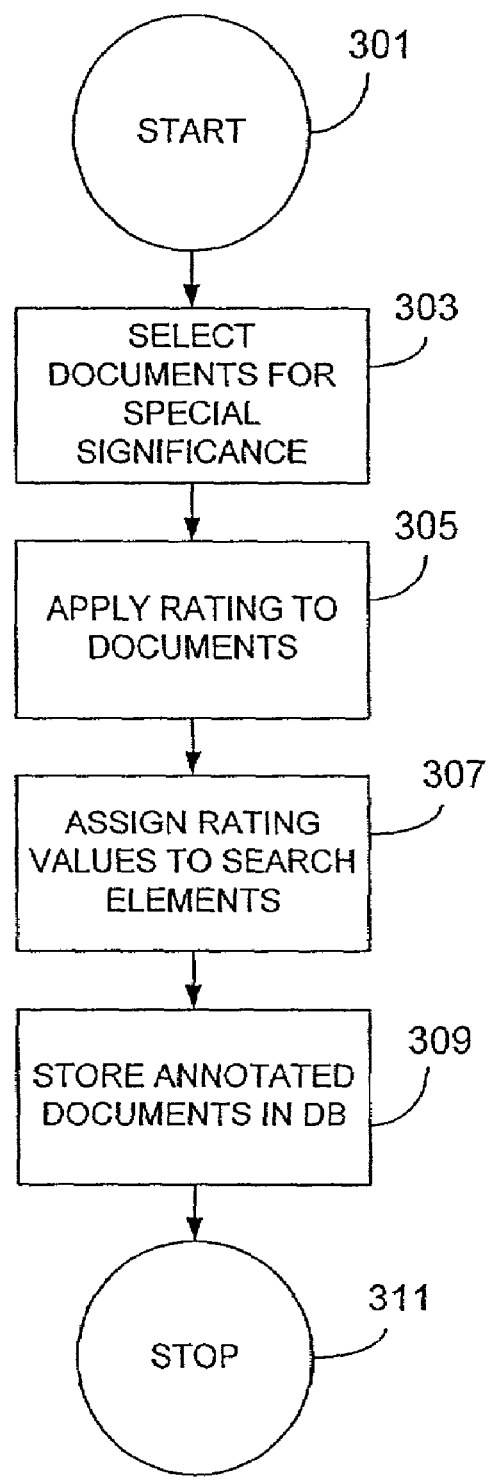
FIG. 3 illustrates a block diagram of a preferred embodiment of the process of rating documents and storing them in a database.

Referring to FIG. 3, in the preferred embodiment, documents are selected for special significance to this community of users 303. The expert reviewers supply ratings for each document 305. Expert input may be provided by the editorial staff of a leading trade journal, by selected leading practitioners in the field, or by other similar expert mechanism. For the purposes of biomedical research expert knowledge, "leading practitioners" are defined as those within the top 10% of researchers within the biomedical sub-specialty in question, as judged by publication record, public recognition through competitive awards (such as the Nobel prize) and peer evaluations.

Figure 5:
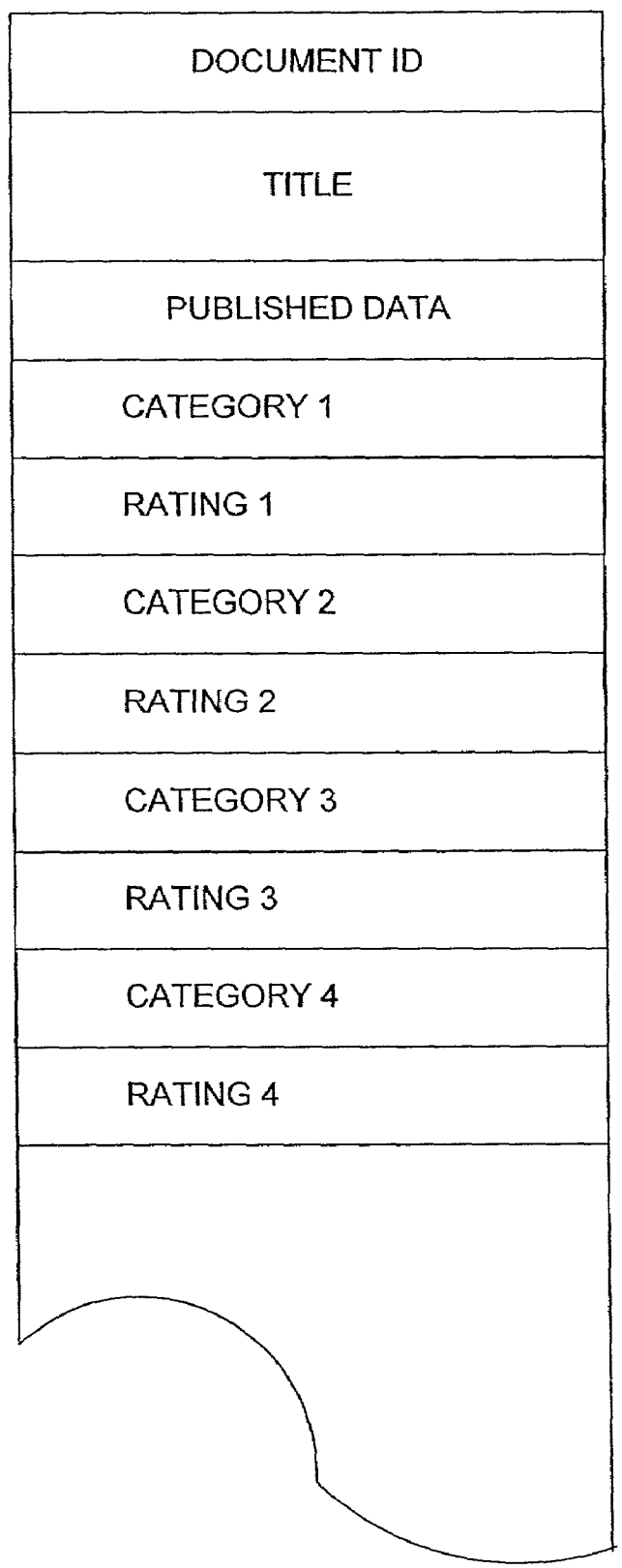
FIG. 5 illustrates a preferred embodiment of an exemplary data structure for the indicia storage related to a document

Rating values are assigned to search elements 307 according to the taxonomy indicia (the taxonomy is described in more detail below). Expert input (as defined in the previous section) regarding each reference is collected under a multidimensional rating taxonomy. Each reference receives ratings under each relevant taxonomic category from each appropriate expert source. A composite rating may be computed from the mean of multiple ratings received under a single taxonomic category. This rating process and calculation is explained in more detail below. When completed the annotated document is stored in the database 309. A generalized data structure for a document in the database is shown in FIG. 5 although those skilled in the art will understand that there are a multitude of ways to structure such an index.

Figure 4:
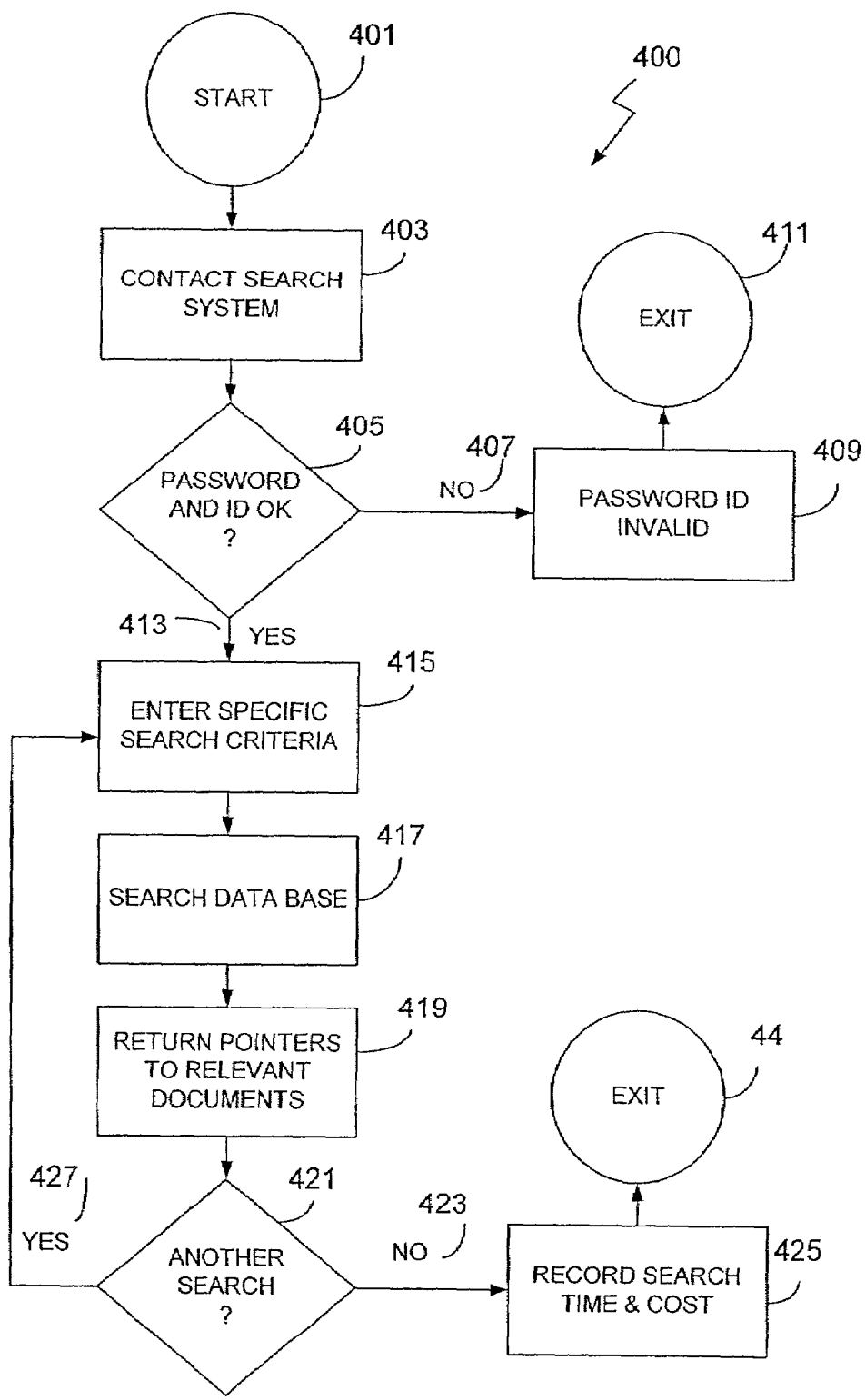
FIG. 4 illustrates a block diagram of a preferred embodiment of the process of search and retrieval from the database.

Referring now to FIG. 4, a generalized proprietary database search and access system 400 is described. Input to such a system 400 may be directly or through the Internet from a client machine which may be a Personal Computer (PC) or from a Personal Data Assistant (PDA) device such as a 3Com™ hand-held device, and may use any number of communications protocols such as HTML, XML, WAP, WML, etc. In FIG. 4, a user contacts the system through its web page 403. The system checks the user's password and ID 405 in order to determine whether the user is a subscriber to the service. If not 407 the user is requested to become a subscriber and if not the system exits 409, 411. If the user is a subscriber 413 he is given a search format page wherein he can enter the specific search criteria 415 in which he is interested. The database is searched 417 for matches to his input criteria, and a page of pointers to relevant documents is returned 419. The user may request another search if he desires 421, 427 or he may terminate the search 423 at which time his search time and costs are calculated and saved 425 for periodic billing of the user. Alternative billing/subscription schemes may be used wherein the subscriber is billed a flat fee per period.

Within this general framework of document selection, coding and indexing with subsequent search and retrieval, the unique aspects of the invention are now described in more detail.

The Taxonomy

Figure 7C:

A taxonomy for biomedical knowledge for use in a preferred embodiment of the present invention is shown in FIG. 7A–7C.

Rating according to the Taxonomy

The rating is done by acknowledged experts in the dimension of relevance, in a peer-review process analogous to grant proposal review, or pre-publication manuscript review. It is this process that brings credibility to the ratings. One cannot simulate this with reviews written by online users. When one reads a review for a book on Amazon that says: ". . . most useful book I have read in the past two years . . ." one doesn't know what qualifications that individual has, whether in fact he or she has read more than one book in the past two years, or whether he/she is a nut.

In the preferred embodiment, document reviewers perform the reviews as follows. Referring to FIGS. 7A–7C, a document reviewer initially selects the Enterprise Domain 701 type B 703, type T 705, type C 707 or type S 709. The reviewer then selects a type 713 in the Disease Group 711, if applicable, and a type 717 in the Underlying Concepts Group 715 if applicable.

If the reviewer selects B 703 or T 703 in the Enterprise Domain 701, he then selects a type Reductionist 721 or Abstractive 723 in the Investigative Emphasis group 719. If B 703 was selected in the Enterprise Domain 701, the reviewer then selects a topic type 727 from the 1B1 Topic Group 725. If T 703 was selected in the Enterprise Domain 701, he selects a topic type 731 from the ITI Topic Group 729. If C 707 was selected in the Enterprise Domain 701, the reviewer then selects a topic type 735 from the 1C1 Topic Group 733. If S 709 was selected in the Enterprise Domain 701, the reviewer then selects a topic type 739 from the 1S1 Topic Group 737.

Thus, a particular document might be coded 1B, 2G, 3L, 4R, 1B1-03 for a document that was deemed to be about

"Basic Science, describing a Genetic Disease, with Scientific Certainty, using a Reductionist investigative emphasis, wherein the gene/DNA structure is described."

Similarly, a searcher for such a document would specify in the search criteria

1.—basic science;
2.—genetic disease;
3.—scientific certainty;
4.—reductionist; and
5.—gene/DNA structure.

and the search engine can convert this to 1B, 2G, 3L, 4R, 1B1-03

In some cases, a search request for

1.—basic science;
2.—genetic disease;
3.—any;
4.—any; and
5.—gene/DNA structure would produce any documents matching 1B, 2G, any, any, 1B1-03.

Those skilled in these arts will recognize that various other specific codings for such taxonomic structures may be used without deviating from the spirit of the invention.

User Profiles

A personalized search strategy based on each individual's weighted preferences in the categories of our multidimensional taxonomy. For example, the attributes 1B, 2G, 3L, 4R, 1B1-03 of the above example might carry associated weightings assigned based on prior observation, or by hypothesis. Thus, in one example, one might assign importance to each attribute as in: 1B/9.4, 2G/3.4, 3L/3.1, 4R/2.5, 1B1-03/1.1, with each weighted value reflecting the user's personalized level of interest in matching each category. Such preference information might, for example, have been collected at the time of initial user registration at the web site. A person might want to know the most significant recent developments in the field of cancer, but what does that really mean? If that person's preferences are for developments of translational interest or, even more complicating, developments of translational interest which offer opportunities for investment, the prior art systems of keyword searches could never satisfy this requirement. Thus, our rating taxonomy allows for novel ways of searching for "significant" knowledge. The search is personalized with respect to what would be considered significant by a given individual.

Search/Qualitative Matching Engine

As an example, a search function that takes x inputs on the user profile, and y inputs on each database item and returns a list of documents, each with a mathematical probability of a match, may be used. Any appropriate quantitative matching algorithm may be used. For example, Liquid Engines™, Inc. has developed a generally applicable matching algorithm which may be used for this purpose.

An Exemplary Functional System Description

An exemplary preferred embodiment of the system of the invention could encompass two types of discussion groups, or "bulletin boards":

Public Groups: Wherein users can create a discussion group, and add comments to it and share comments with their "friends" or other members. A group creator "manages" the group, and can add, remove, and manage members.

Subscription Groups: Wherein users pay a fee to see comments and feedback of articles and content from experts within a field. Articles and comments are rated within a set of categories by experts and are then searchable by date or relevance for those subscribing to those groups.

What are the most significant things that have happened within this field within the last month?

The ability to search content by significances according to Taxonomy criteria as described above.

Features

Both sets of groups share some common functionality, and as such the preferred embodiment design would be such that the core of the system is common. For the purposes of this spec, the two group types will be distinguished by "Public" groups and "Subscription" groups.

| Feature | Public | Subscription |
|---|---|---|
| Group Creation | Yes, by anyone | No, only by system admin. Groups also only correspond to "Taxonomy" fields |
| Add Members | Yes, by owner | Anyone can join if they pay |
| Remove Members | Yes, by member, or by owner | If you don't pay, you are removed. A user can remove themselves and forfeit their subscription |
| Group Deletion | Yes, by owner | No, only by system administrator |
| Post Messages | Yes, by anyone in the group | Only by "elite" members |
| Rate Messages in categories | No | Multiple members can rate the same message |
| Delete Messages | Yes, by owner | Only by system administrator |

In the preferred implementation below, the system will generate a framework in which both types of groups can exist in the same suite of tables in a database, with different front end implementations.

Definitions

We can define four roles played in the group system:

Public Groups

Public Owner—This user created and manages a group

Public Member—This user has been added to a public group.

Subscription Groups

Elite Member—Posts messages, and rates postings by other members.

Subscription Member—Observes postings by elite members and can search database by taxonomy criteria.

Database Implementation

The implementation consists of additions of a user membership tables, group tables, and finally a messaging table for determining messages contained within a particular group.

Membership Table "tbl Membership"

The membership table simply indicates whether the user is a member of a group or not. It also contains the time at which point a users membership expires (if at all), as well as a billing reference (customizable depending on what billing service is used.)

| Column Name | Condensed Type | Nullable | Description |
|---|---|---|---|
| UserID | uniqueidentifier | NOT NULL | User ID who is a member |
| GroupID | uniqueidentifier | NOT NULL | Group ID that UserID is a member in . . . This column is indexed. |
| Perms | integer | NOT NULL | Flags defining what type of member this user is in a group |
| ExpireTime | datetime | NULL | When their membership expires |
| BillingID | varchar(64) | NULL | The billing or tracking ID of the last commerce payment associated with this payment. (Type may change) |

For all "public" group, the "ExpireTime" and the "BillingID" will be NULL for Public Owners and Public Members.

For a "subscription" group, the "Expire Time" and "BillingID" will be NULL for Elite Members, but not for Subscription Members.

These constraints should NOT be used to determine what type of group the user is included in.

This table contains a PRIMARY KEY which is (UserID, GroupID)

In addition, a UNIQUE constraint is placed upon (UserID, GroupID) to prevent multiple inclusions of a user in a group.

The Perms is a bitfield (where any value can be on or off) which described the type of privileges a user has within a group.

| Flag Value | | Meaning | |
|---|---|---|---|
| Dec | Binary | when 0 | when 1 |
| 1 | 0 . . . 00000001 | Public Group | Subscription Group |
| 2 | 0 . . . 00000010 | Appears in list of groups all users can see | Does not appear in list of groups all users can see |
| 4 | 0 . . . 00000100 | Anyone can join group | Requires invitation from Owner |
| 8 | 0 . . . 00001000 | — | — |
| 16 | 0 . . . 00010000 | — | — |

More flags will be added as they are needed.

| Perms Value | | | Meaning | |
|---|---|---|---|---|
| Dec | Binary | Category | when 0 | when 1 |
| 1 | 0 . . . 00000001 | User List within Group | User can not add users to group | User may add users to group |
| 2 | 0 . . . 00000010 | | User can not remove users from group | User can remove other users from group |
| 4 | 0 . . . 00000100 | | User may not view user list for group | User may view user list for group |
| 8 | 0 . . . 00001000 | Message List within Group | User may not post messages to group | User may post messages to group |
| 16 | 0 . . . 00010000 | | User may not delete messages from group | User may delete messages from group |
| 32 | 0 . . . 00100000 | | User may not view messages from group | User may view messages from group |
| 64 | 0 . . . 00100000 | | — | — |

Additional flags will be added as needed.

Group Table "tbl Groups"

The group table outlines the details of a particular group:

| Column Name | Condensed Type | Nullable | Description |
|---|---|---|---|
| GroupID | uniqueidentifier | NOT NULL | The unique ID for this Group |
| OwnerID | uniqueidentifier | NULL | The UserID of the owner (NULL in subscription groups) |
| CreationTime | datetime | NOT NULL | Time of group creation |
| Name | varchar(64) | NOT NULL | The "short" name of the group |
| Description | varchar(1024) | NULL | The "long" description of this group. |
| Flags | Integer | NOT NULL | Flags determining type and membership access to group (see below) |
| BillingURL | varchar(1024) | NULL | Optional billing URL for subscription groups. |
| BillingID | varchar(64) | NULL | Optional billing information for commerce systems (Type may change) |

The "Flags" field is a bitfield (so multiple values may be on or off) which maps to the following values:

Messages Table "tbl Messages"

The Messages Table contains messages posted to all groups.

| Column Name | Condensed Type | Nullable | Description |
|---|---|---|---|
| MessageID | uniqueidentifier | NOT NULL | The ID of this message (unique) |
| UserID | uniqueidentifier | NOT NULL | The User who posted this message |
| ToUserID | uniqueidentifier | NULL | An optional "To" user for private messages (e.g. to group owners, etc.) |
| GroupID | uniqueidentifier | NOT NULL | The group ID this message was posted to |
| PostTime | datetime | NOT NULL | The time of the post |
| Subject | varchar(256) | NOT NULL | The subject of this post |
| Message | varchar(2048) | NOT NULL | The message or comment from the user about the content (if any) |
| ContentType | Integer | NULL | The type of information being commented on |
| ContentURL | varchar(1024) | NULL | The URL or information being commented upon |

The ContentType is the type of information being commented about:

| Content Type | Meaning |
|---|---|
| 0 | No content |
| 1 | BioExpertise Site Family URL (within family of sites) |
| 2 | Advertisement URL (comment on advertisement) |
| 3 | External URL (outside of sites) |
| 4 | Dead URL (URL has been checked and no longer works) |

An index should be created for GroupID to accelerate searching for all messages within a group.

Ratings Table (tbl Ratings)

The Ratings Table contains ratings for subscription based groups. Ratings are based upon the relevance of a particular reference to a taxonomic category, as described above.

| Column Name | Condensed Type | Nullable | Description |
|---|---|---|---|
| MessageID | uniqueidentifier | NOT NULL | The ID of this message (unique) |
| UserID | uniqueidentifier | NOT NULL | The User who is rating this message |
| GroupID | uniqueidentifier | NOT NULL | The relevance of this message to this group |
| RatingTime | datetime | NOT NULL | The time of this rating |
| RatingA | smallint | NOT NULL | The rating in category A |
| RatingB | smallint | NOT NULL | The rating in category B |
| RatingC | smallint | NOT NULL | The rating in category C |
| ... | | | |
| RatingZ | smallint | NOT NULL | The rating in category Z |

Given a MessageID that is to be rated and a UserID who is rating a message, the "rating" script will do:

SELECT*FROM tbl_Groups WHERE (Flags & 1=1);

The expert user will rate the relevance to these references according to the Taxonomy shown in FIGS. 7A–7C, which will then generate a list of ratings. For some "references" there will be no rating, in which case no value will be added to the database. So, for example, the user is presented with:

---

BioCritique.com
Article posted July 5th, 2000 by "cancerexpert" to group "Cancer" in Biocritique:
   Date: July 5th, 2000 12:23AM GMT
   Content: (See content below)
(citation)
   Subject:
Rate this Reference (Select Categories)
You are logged in as "acureisoutthere". Please rate cited article on each of the following attributes (scale of 1–10)

| Category | Rate in Category |
|---|---|
| GENOMES, POPULATIONS AND EVOLUTION | 6 |
| GENE/DNA STRUCTURE | 2 |
| RNA SYNTHESIS, STRUCTURE, FUNCTION | |
| PROTEIN SYNTHESIS, STRUCTURE, FUNCTION | ✓ |
| METABOLIC PATHWAYS | |
| MACROMOLECULAR TRANSPORT | ☐ |

[Rate Message in]

When the user clicks "Rate Message in Checked Categories" the user then goes through a process of rating as follows:

Finally, rating this message based on tbl_Ratings database table is updated with 2 rows:

| | | | | |
|---|---|---|---|---|
| reference ID of article | UserID of acureisoutthere | GroupID of "GENOMES, POPULATIONS AND EVOLUTION" | Current Time | 7 0 3 . . . |
| Reference ID of article | UserID of acureisoutthere | GroupID of "PROTEIN SYNTHESIS, STRUCTURE, FUNCTION" | Current Time | 0 0 2 . . . |

The document classification sub-system measures the user's perception and evaluation of the document. A set of questions in the form of analysis screens is posed to the user regarding the relevance of the document being rated, which the user responds to by selecting an option box ("Highly irrelevant," "irrelevant," "Slightly irrelevant," "Neutral," "Slightly relevant," "relevant," and "Very relevant.") Sample rating categories include: "Basic Science Impact"; "Technology Impact"; "Business Impact"; "Societal Impact"; and "Clinical Impact." Each category is scored on a seven-point scale (−3 to +3) where a score of −3 is "Highly Irrelevant" and +3 is "Very Relevant."

An Exemplary Embodiment

A present exemplary embodiment of the invention is found at the web site biocnticiue.com. Once a user has logged on to the system she is able to post an article, rate an article, critique an article or search for articles that correlate most closely with the specific interests of the user. Those users who are permitted to post and rate an article are members of a selected "expert panel" who have agreed to participate in this system.

Expert Panels and Article Selection

In the exemplary embodiment, the work of the expert panels in the BioCritique Forums rapidly forms a database of rated articles and reviews from which users can obtain significant information relevant to their specific needs, i.e. the latest important developments in their own and related fields. Panels of 15 top experts in each topic area post, map and critique articles deemed to have a high impact in their field. Every month, each of the 15 panelists on the Bioethics Forum will attempt to post two articles they consider to be of major importance. They will then anonymously rate and critique two articles from their postings or those of other panelists, thereby providing a first level of peer (i.e. panel-specific) review. User comments and ratings, tracked and reported separately, will provide a second level of validation. Each article selection will thus be subjected to review first by other members of the panel, then by members of the professional community. This process protects the credibility of the Forum with regard to article selection.

Knowledge-Mapping and Pattern-Matching

In the exemplary preferred embodiment, Panelists will map articles using BioCritique's multi-dimensional taxonomy of significance (see below). Users store quantitative profiles of their interests rated across the same taxonomy. Pair-wise correlations are performed to sort the database for each user. A search of the BioCritique database is thus based on an intuitive "pattern-matching" concept akin to the way human beings relate to information in the real world. Users can store multiple profiles, thereby customizing them to different needs.

The fundamental ingredients of the mapping (rating) taxonomies employed within Biocritique are dimensionality and analog scaling, specifically designed for biomedical knowledge. Unlike keyword taxonomies, which are binary and one-dimensional, in the exemplary embodiment BioCritique looks at each object in its database in 6 primary dimensions, rating each on a scale. For example, the Attributes dimension scores the following parameters on a scale of 1 to 9:

0405 HOW NOVEL (HYPOTHESES AND FINDINGS)
0410 HOW CONTROVERSIAL (HYPOTHESES AND CONCLUSIONS)
0415 HOW RIGOROUS (EXPERIMENTAL DESIGN AND EXECUTION)
0420 HOW READABLE (ARTICLE)

Similarly, the Perspectives dimension is scored across the following categories:

0101 BASIC SCIENCE IMPACT
0102 TECHNOLOGICAL IMPACT
0103 BUSINESS IMPACT
0104 SOCIETAL IMPACT
0105 CLINICAL IMPACT

Rating any one of these categories triggers the appearance of subcategories. For example, a rating in the CLINICAL IMPACT category would reveal the following subcategories:

0905 CLINICAL INTERVENTIONS
0910 DIAGNOSIS
0915 DISEASE PREVENTION
0920 EPIDEMIOLOGY/PUBLIC HEALTH
0925 DISEASE ETIOLOGY
0930 CLINICAL TOXICOLOGY

The expertise dimension contains a large number of biomedical specialties ranging from Biostatistics to Toxicology. Disease dimension categories are subcategorized. A rating under Cardiovascular would trigger the following subcategories:

ACUTE CORONARY SYNDROMES
ARRHYTHMIAS
CVD:PREVENTION & RISK MANAGEMENT
VASCULAR BIOLOGY
HEART FAILURE
STRESS TESTING/NON-INVASIVE CARDIOLOGY
CVD:CLINICAL TRIALS
HYPERTENSION
CVD:INTERVENTIONAL & DEVICES

In all, there are several hundred rating categories in this scheme. Because the ratings are quantitative (rather than binary, as in the case of keyword-based systems), it is possible to perform pair-wise correlation analyses between rating iapattemsle. Measures of proximity in this multi-dimensional space thus permit mapping and relational retrieval of disparate data types (research articles, drugs, company programs, book reviews) using a common syntax. The purpose of building multi-dimensional coordinates for each object in the database is to permit sorting of research articles according to each user's personal mix of interests and values.

An exemplary preferred embodiment of the invention is now described with respect to FIGS. 8–17.

Figure 8:
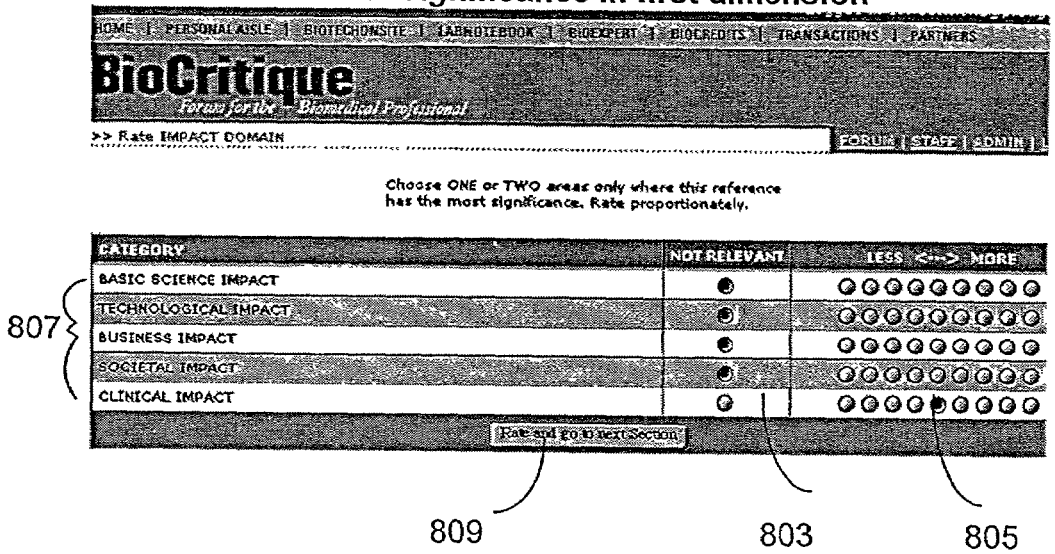
FIG. 8 illustrates a preferred embodiment of an exemplary input screen showing how to rate significance in a first dimension.

In FIG. 8 a first rating screen 800 is illustrated, indicating that the user is to rate the significance in a first dimension 801. Shown on the screen are five basic categories 807. The user chooses one or two categories by indicating which categories are not relevant 803. In this example "clinical impact" has been chosen. For each category chosen the user chooses a relevancy category on a scale of 1–9. Here the user has selected an indication which has a value of 5. 805. On completion of the rating process the user clicks on the button 809 to go to the next section. These selections would produce a basic "Impact Domain" selection vector, for example, that would look like this:

| BSI | 0 |
| TI | 0 |
| BI | 0 |
| SI | 0 |
| CI | 5 |

Figure 9:
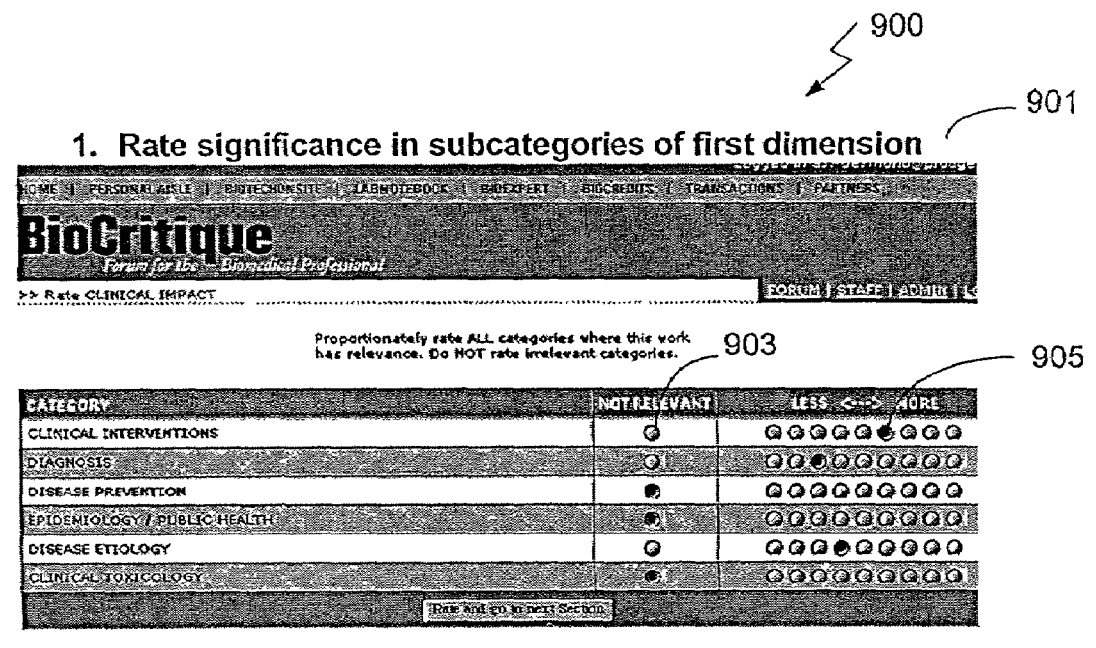

In FIG. 9 the next section shows the subcategories of first dimension related to the "Clinical Impact" selection 900. Once again, the user selects the categories shown that are not relevant 903 and for the categories deemed relevant, a rating selection is made 905. In the case indicated, the selection vector would be:

| CI | 6 |
| D | 3 |
| DP | 0 |
| EPH | 0 |
| DE | 4 |
| CT | 0 |

Figure 10:
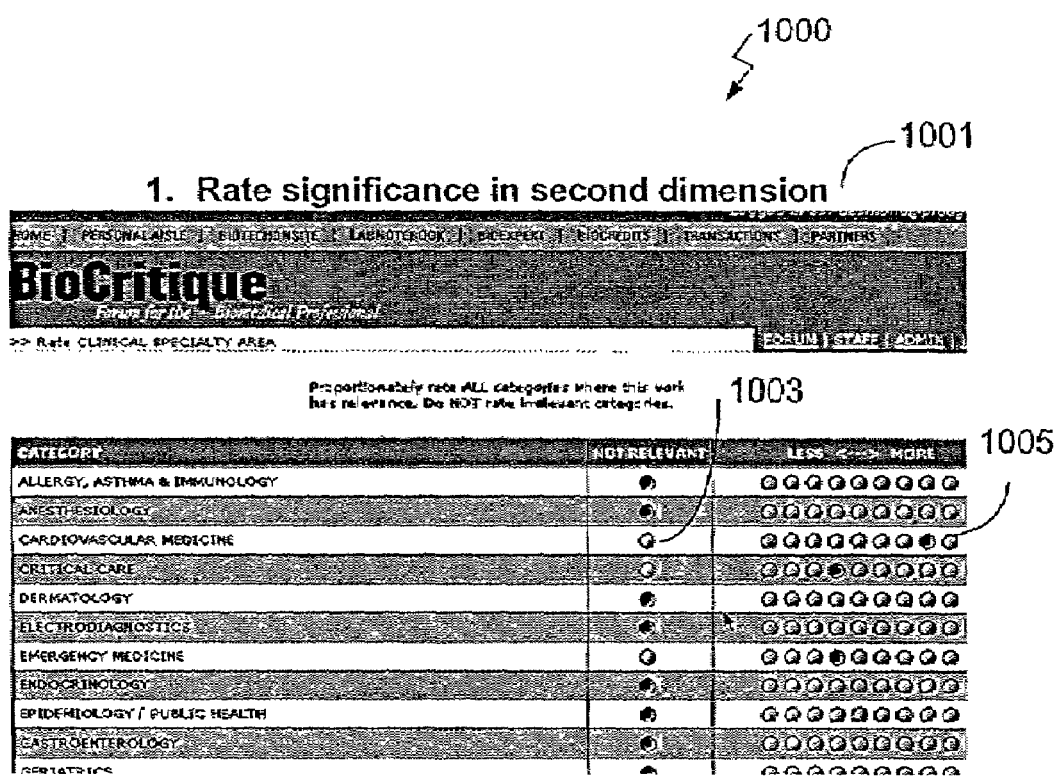
FIG. 10 illustrates a preferred embodiment of an exemplary input screen showing how to rate significance in a second dimension.

The user is then asked to rate the significance in a second dimension related to "clinical impact" 1001 in FIG. 10. Once again the categories in this second dimension which are deemed not relevant are selected 1003. For each category deemed relevant a rating in indicated 1005. In the case indicated, the selection vector would be:

| AAI | 0 |
| A | 0 |
| CM | 8 |
| CC | 4 |
| D | 0 |
| E | 0 |
| EM | 4 |
| EN | 0 |
| EP | 0 |
| GA | 0 |
| GE | 0 |

Figure 11:
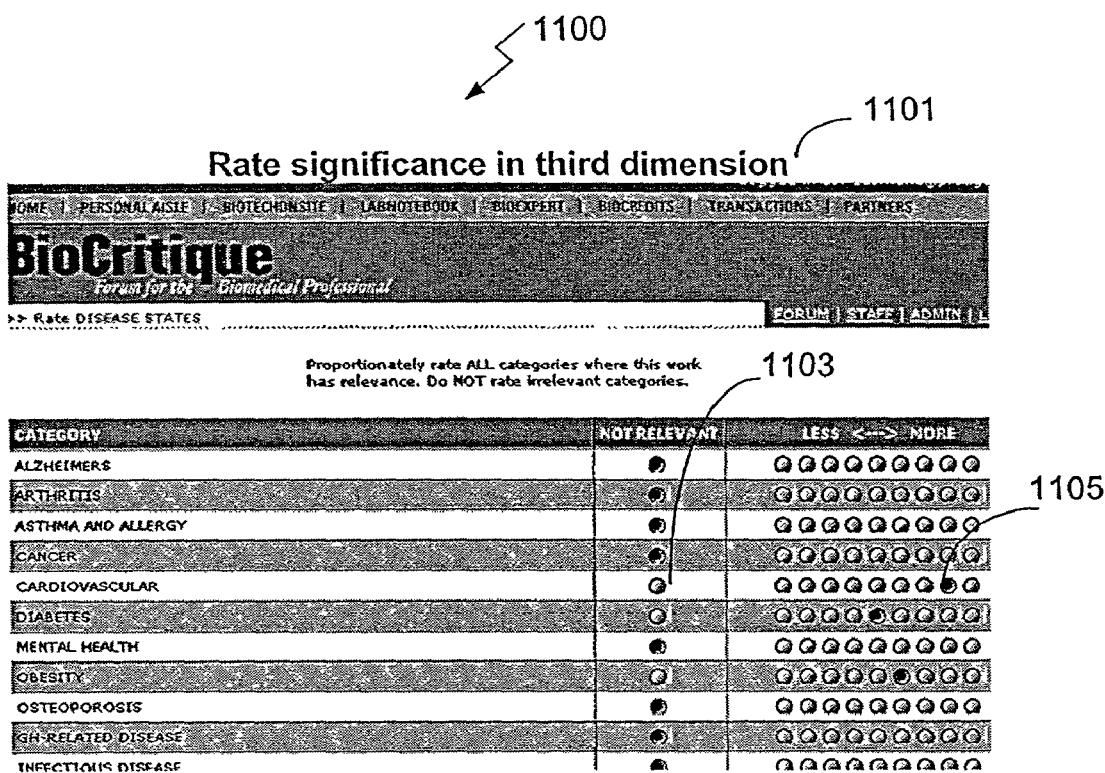
FIG. 11 illustrates a preferred embodiment of an exemplary input screen showing how to rate significance in a third dimension.

Referring now to FIG. 11, the user is requested to rate the significance in a third dimension ("disease states") 1101. As before the user elects those categories not relevant 1103 and for the ones deemed relevant a rating is selected 1105. In this case the selection vector would look like:

| | |
|---|---|
| AL | 0 |
| AR | 0 |
| AS | 0 |
| CA | 0 |
| CAR | 8 |
| DI | 5 |
| MH | 0 |
| OB | 6 |
| OS | 0 |
| GH | 0 |
| ID | 0 |

Figure 12:
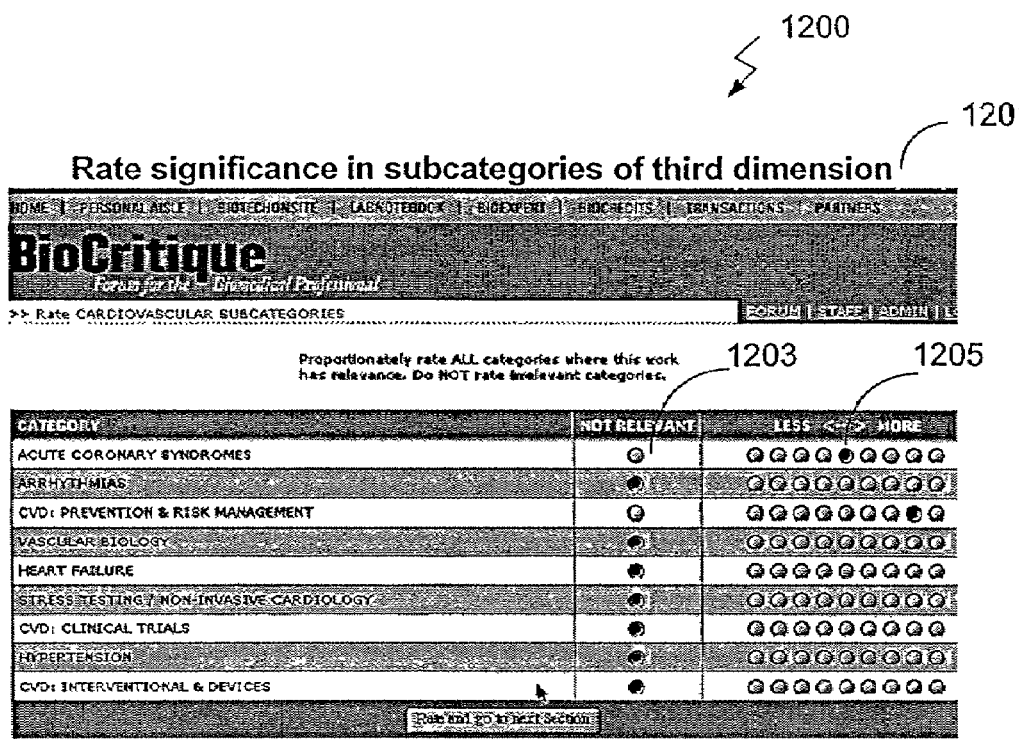
FIG. 12 illustrates a preferred embodiment of an exemplary input screen showing how to rate significance in subcategories of third dimension.

Referring now to FIG. 12, the user is asked to rate the significance in subcategories of third dimension 1201, which in this instance relate to "cardiovascular subcategories." Here the user again elects the categories that are "not relevant" 1203 and for each category deemed relevant, a rating is selected 1205. In this case the selection vector would look like:

| | |
|---|---|
| ACS | 5 |
| AR | 0 |
| CVDP | 8 |
| VB | 0 |
| HF | 0 |
| ST | 0 |
| CVDC | 0 |
| HY | 0 |
| CVDI | 0 |

Figure 13:
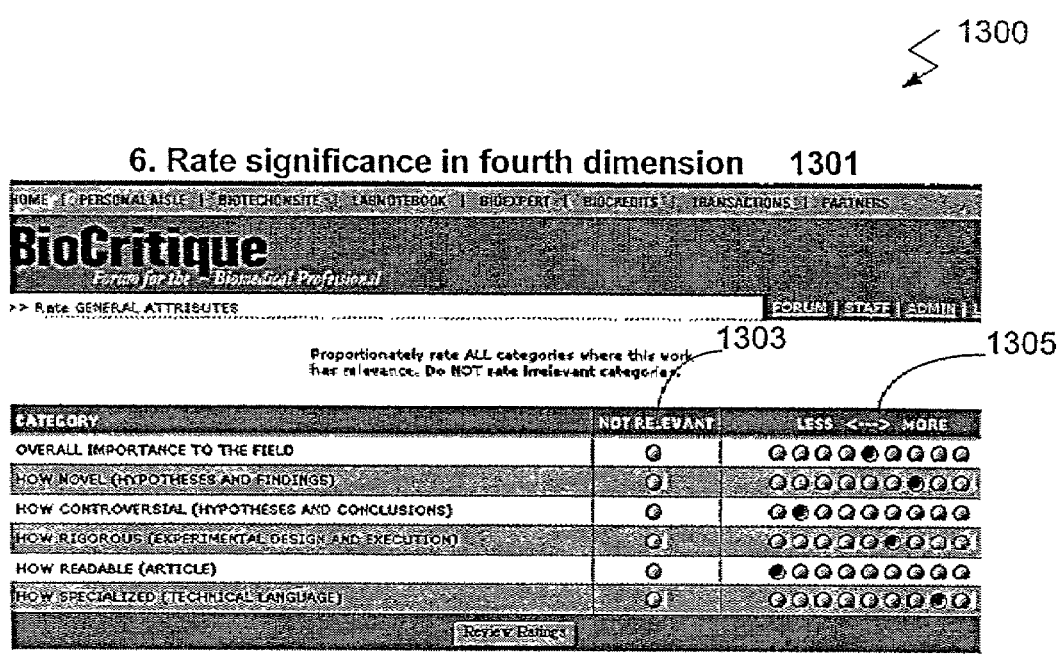
FIG. 13 illustrates a preferred embodiment of an exemplary input screen showing how to rate significance in a fourth dimension.

Finally, referring to FIG. 13, the user in this example would be asked to rate General Attributes, which in our rating scheme would be rating significance in a fourth dimension 1301. In this case all categories are deemed relevant 1303 and selections made for each 1305. Here the significance vector would look like this:

| | |
|---|---|
| IMP | 5 |
| NOV | 7 |
| CON | 2 |
| RIG | 6 |
| REA | 1 |
| SPE | 8 |

Figure 14:
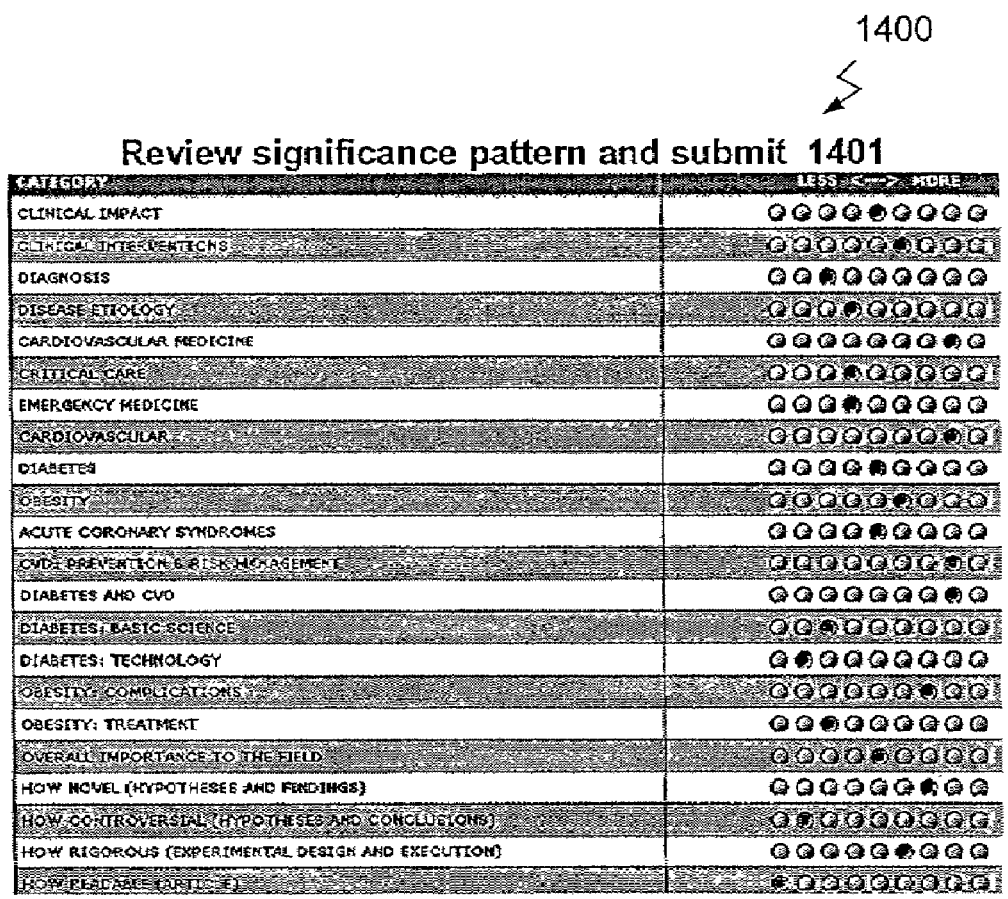
FIG. 14 illustrates a preferred embodiment of an exemplary input screen showing a summary review significance pattern.

Given a combination of all of these significance selections, a summary is shown in FIG. 14. As indicated, this exemplary rating of a given document by a user would produce the significance vectors as indicated above and these would be stored with the document. Another user who would review the same document and provide a similar rating could very well select different categories and different significance ratings even for the same categories. In a preferred embodiment, these different significance vector values are averaged and the resulting vector with the averages is saved with the document along with a "number of raters" value which is used to compute the new average. For example, looking at the significance vector associated with the description of FIG. 9 above, if we had a second review of this document the system would execute the acts to produce a significance vector with averages for each category as follows:

| | 1st Rater | 2nd Rater | New Vector |
|---|---|---|---|
| CI | 6 | 4 | 5 |
| D | 3 | 2 | 2.5 |
| DP | 0 | 1 | 0.5 |
| EPH | 0 | 0 | 0 |
| DE | 4 | 8 | 6 |
| CT | 0 | 5 | 2.5 |

Raters = 1    2

Figure 15:
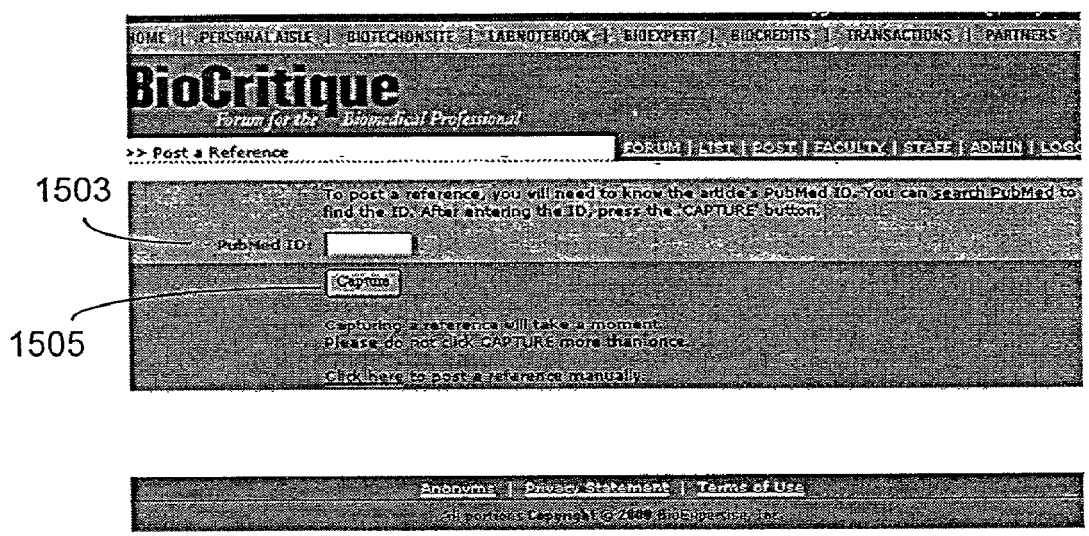
FIG. 15 illustrates a preferred embodiment of an exemplary input screen showing how to capture a document from the PubMed database.
Figure 16:
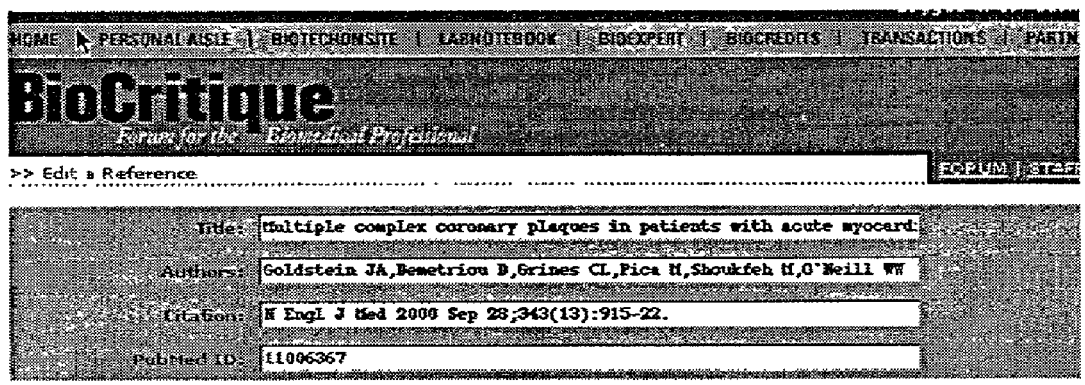
FIG. 16 illustrates a preferred embodiment of an exemplary input screen showing haw to submit a reference to the database of the invention.
Figure 17:
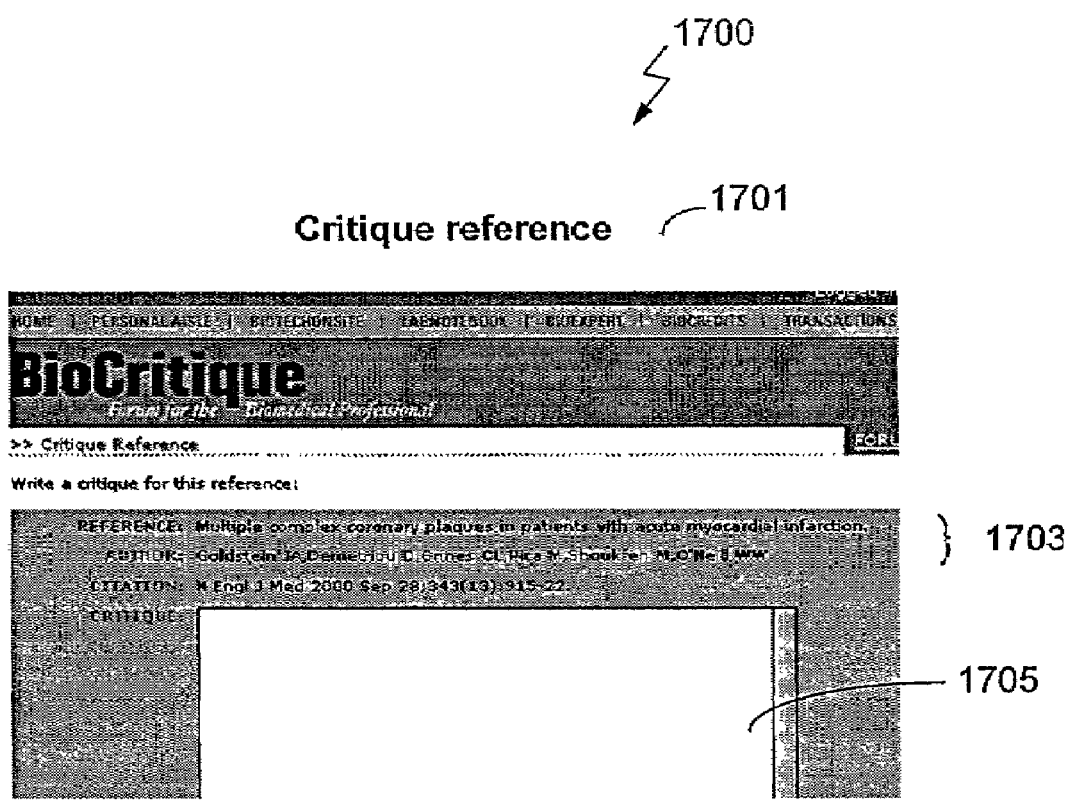
FIG. 17 illustrates a preferred embodiment of an exemplary input screen showing how to submit a critique of a reference to the system of the invention.

As can be seen, the panel of Expert Reviewers will, over time, review the documents submitted multiple times and this rating structure permits a valuation of a general consensus of the experts opinions relative to a given document. Additional personal critiques of the documents can be inputted and saved with links to the specific document, wherein these critiques can be found whenever a document is displayed to a searcher. FIGS. 15–17 disclose an exemplary set of screens which facilitate downloading a reference (FIG. 15), submitting the reference to the BioCritique database (FIG. 16), and adding personal comments to a reference (FIG. 17).

Searching for Documents

Registered users of the system containing the invention (hereinafter "BioCritique") can create and save a set of significance vectors to be used regularly thereafter whenever they sign on, or a special one-time set of significance vectors can be generated. This set of significance vectors are the same as those indicated above, and are generated by the user going through the same set of screens as shown in FIGS. 8–14.

When a user wants to find a set of documents matching his/her significance vectors, in the preferred embodiment, the search is conducted by doing a pair-wise correlation between the user specific significance vectors and the significance vectors stored for each document. This pair-wise correlation is performed using the Pearson correlation coefficient method (which is explained below). A Pearson correlation coefficient ("r") is calculated for each document and the documents then sorted with those having the highest "r" value first. The first 10 such documents meeting a minimal "r" value level are then presented to the searching user.

Pearson Correlation Coefficient

The Pearson Correlation indicated above is described in standard statistical textbooks such as Romesburg, H. C. (1984). *Cluster Analysis for Researchers*. Lifetime Learning Publications. Pp. 334.

Sharma, S. (1996) *Applied Multivariate Techniques* John Wiley & Sons. Pp. 493.

Srivastava, M. S. and E. M. Carter. (1983) *An Introduction to Applied Multivariate Statistics*. North-Holland. Pp.394.

Tabachnick, B. G. and L. S. Fidell. (1996) *Using Multivariate Statistics*. Harper Collins. Pp. 860, but for completeness is described generally as follows.

The correlation between two variables reflects the degree to which the variables are related. The most common measure of correlation is the Pearson Product Moment Correlation (called Pearson's correlation for short). When measured in a population the Pearson Product Moment correlation is designated by the Greek letter rho ($\rho$). When computed in a sample, it is designated by the letter "r" and is sometimes called "Pearson's r." Pearson's correlation reflects the degree of linear relationship between two variables. It ranges from +1 to −1. A correlation of +1 means that there is a perfect positive linear relationship between variables. A correlation of −1 means that there is a perfect negative linear relationship between variables. It would be a negative relationship because high scores on the X-axis would be associated with low scores on the Y-axis. A correlation of 0 means there is no linear relationship between the two variables.

The formula for Pearson's correlation takes on many forms. A commonly used formula is shown below. The formula looks a bit complicated, but taken step by step as shown in the numerical example below, it is really quite simple.

A numerical example is as follows:

| X | Y |
|---|---|
| 1 | 2 |
| 2 | 5 |
| 3 | 6 |

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}}$$

$\Sigma XY=(1)(2)+(2)(5)+(3)(6)=30$ $\Sigma X=1+2+3=6$ $\Sigma X^2=1^2+2^2+3^2=14$ $\Sigma Y=2+5+6=13$ $\Sigma Y^2=2^2+5^2+6^2=65$

N=3

$\Sigma XY-\Sigma X\Sigma Y/N=30-(6)(13)/3=4$ $\Sigma X^2-(\Sigma X)^2/N=14-6^2/3=2$ $r=4/\sqrt{(2)(8.6667)}=4/4.16333$ $\Sigma Y^2-(\Sigma Y)^2/N=65-13^2/3=8.667$

=0.9608

This value, 0.9608, would say that the numbers in the X column are highly correlated with the numbers in the Y column (a value of +1.0 meaning the numbers were perfectly correlated).

In our example here, if the X column numbers were derived from a user's inputted answers to three types of ratings, and the Y column were numbers associated with a document's significance vector, then this high correlation (0.9608) would characterize this document as highly likely to be of significant interest to this user and his given search criteria.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for performing the various features of message recognition, message creation, message storage and connection to a mobile telephony system. It will be apparent to those skilled in the art that modifications and variations of the preferred embodiment are possible, such as different mobile telephony systems may be used, different communications media such as wireless communications, as well as different types of PCDs may be used by addressees and or senders of various types of electronic messages, all of which fall within the true spirit and scope of the invention as measured by the following claims.

I claim:

1. A computer implemented method for developing and using significance ratings for biomedical research articles comprising the acts of:
    a) storing a multidimensional rating taxonomy developed for a target domain;
    b) providing a first computer input interface for use in generating a first significance rating for a target biomedical research article according to the multidimensional rating taxonomy, and linking the first significance rating to the target biomedical research article in a database;
    c) providing a second computer input interface for use in generation a new significance rating for the target biomedical research article according to the multidimensional rating taxonomy and combining the new significance rating with the first significance rating to produce a revised significance rating
    d) linking the revised significance rating to the target biomedical research article in the database; and
    e) providing a third computer input interface for generating a commentary for the target biomedical research article.

2. The computer implemented method of claim 1 wherein the target domain is a domain of biomedicine.

3. A computer implemented method for developing and using significance ratings for research articles comprising the acts of:
    a) using a first computer input interface for generating a first significance rating for a target research article according to a multidimensional rating taxonomy developed for a biomedical domain, the computer linking the first significance rating to the target research article in a database;
    b) using a second computer input interface for generating a new significance rating for the target research article according to the multidimensional rating taxonomy, wherein the computer combines the new significance rating with the first significance rating to produce a revised significance rating;
    c) the computer further links the revised significance rating to the target research article in the database; and
    d) using a third computer input interface for generating a significance rating for a specific user according to the multidimensional rating taxonomy, whereby the significance rating for the specific user can be used as a search argument to retrieve research article of interest to the specific user from the database.

4. The computer implemented method of claim 3 wherein the first and new significance ratings are generated for the target research article in a peer-review process, the first significance rating generated by a leading practitioner in a biomedical specialty and the new significance rating is generated by a different leading practitioner in the biomedical specialty.

5. A computer implemented method for developing and using significance rating for articles comprising the act of:

a) using a first computer input interface for generating a first significance rating for a target research article according to a multidimensional rating taxonomy developed for a biomedical domain, the computer linking the first significance rating to the target research article in a database;

b) using a second computer input interface for generating a new significance rating for the target research article according to the multidimensional rating taxonomy, wherein the computer combines the new significance rating with the first significance rating to produce a revised significance rating;

c) the computer further links the revised significance rating to the target research article in the database; and d) using a third computer input interface for generating a commentary for the target research article.

* * * * *